United States Patent [19]

Warren et al.

[11] Patent Number: 4,933,955

[45] Date of Patent: Jun. 12, 1990

[54] TIMING GENERATOR

[75] Inventors: Toney Warren, Livermore; Steven Johnson, Walnut Creek, both of Calif.

[73] Assignee: Silicon General, Inc., San Jose, Calif.

[21] Appl. No.: 161,019

[22] Filed: Feb. 26, 1988

[51] Int. Cl.⁵ .............................................. H04L 7/04
[52] U.S. Cl. ..................................... 375/20; 375/106; 331/49; 328/63
[58] Field of Search ...................... 331/1 R, 11, 10, 34, 331/49; 328/179, 133, 63, 55; 371/61; 375/20, 106, 108, 107, 4; 370/100, 108

[56] References Cited

U.S. PATENT DOCUMENTS

| | | | |
|---|---|---|---|
| 3,629,503 | 4/1969 | Rempert . | |
| 3,940,558 | 2/1976 | Gabbard et al. | 375/107 |
| 4,630,291 | 12/1986 | Lankar et al. | 375/107 |
| 4,685,101 | 8/1987 | Segal et al. | 370/102 |
| 4,694,472 | 9/1987 | Torok et al. | 375/107 |
| 4,805,195 | 2/1989 | Keegan | 370/108 |

FOREIGN PATENT DOCUMENTS

| | | |
|---|---|---|
| 0109332 | 10/1983 | European Pat. Off. . |
| 0199004 | 2/1984 | European Pat. Off. . |
| 0176464 | 8/1985 | European Pat. Off. . |
| 0185348 | 12/1985 | European Pat. Off. . |
| 2130847 | 9/1983 | United Kingdom . |
| 2137853 | 4/1984 | United Kingdom . |

Primary Examiner—Benedict V. Safourek
Assistant Examiner—Marianne Huseman
Attorney, Agent, or Firm—Hecker & Harriman

[57] ABSTRACT

The circuitry of the present invention taps a DS0 data stream and outputs a timing signal to drive terminal multiplexers. Even if the data bit stream is lost, the present invention continues to provide proper clocking signals. A composite clock (bit and byte clock) is provided by the present invention with the bit clock at 64 KHz and the byte clock at 8 KHz in the preferred embodiment. To avoid the problem of phase shift over long distances (limiting cable length) the present invention phase adjusts the digital bit stream clocking signal with a 360 degree delay, giving the appearance of advancing the signal in phase. An additional delay of one frame width is applied to the signal. A negative phase delay equivalent to cable runs from 0–1500 feet in 500 foot increments is also applied. In the preferred embodiment, a shift register is tapped in reverse order to accomplish this phase delay.

13 Claims, 6 Drawing Sheets

TIMING GENERATOR

BACKGROUND OF THE INVENTION

1. Field of the Invention

This invention relates to the field of timing signal generation and regeneration for digital transmission where an external frequency is used and in particular to providing clocking signals in connection with digital format data transmission for digital signals having only data bits and having no framing reference signals defining the start and end of a data bundle.

2. Background Art

In a typical digital data transfer, digital data is multiplexed into a serial stream and transmitted a demultiplexer for recovery and decoding. For accurate data recovery, it is necessary to define data "segments" or "windows" to enable the demultiplexing circuitry to determine when one segment begins and another one ends. This permits the demultiplexing circuitry to look for a "zero" or a "one" bit at the proper moment in time. If the demultiplexing circuitry looks for bit information at the wrong time, an erroneous reading will result.

In prior art data transfer applications, a window is defined by providing a signature bit or bits for use as a "frame signal". The signature bit sequence of frame bits do not represent any data but rather define a boundary of a data frame. Data transfers made in this method are known as time division multiplexed (TDM) bus transfers.

One such prior art scheme is disclosed in Rodman et al, U.S. Pat. No. 4,411,007. Rodman is directed to a TDM communication system incorporating delays in the transmission so that a packet arrives at a central station within the right time frame regardless of the transmitters distance from the central station. Shift registers are used to implement the delay in the transmission. Rodman is directed to a "DS1" digital data format. The DS1 digital format supplies a framing bit to identify data segments.

Troost, U.S. Pat. No. 4,488,292 is directed to a TDM network utilizing delays between frames and compensating for the effects of line delays by using a memory to create delays approximating a full frame. The method of Troost requires and relies on the presence of a frame mark bit defining individual pulse frames.

Certain data transmission formats lack the frame bit required by Rodman and Troost. For example, a "DS0" data transfer format lacks the frame bit of the DS1 format. In the DS0 format, demultiplexing circuitry utilizes the bit stream itself to provide a clocking signal which may be used for frame identification.

In the DS0 format, data arrives at a multiplexer clocked from a remote site with a clock that is nominally the same frequency as the clock derived at the site. This data provides the bit "1" time position. Such transmission requires an external clock to define boundaries of data segments. Because of transmission delays of clock to mux and data from mux to mux, limits exist for cross connecting data based on a composite of the clock to mux distance and mux to mux distance.

In a digital network, various devices, such as channel banks, digital switches, ISDN hardware, and other devices require synchronized distribution timing signals at the DS0 or DS1 data rate. When in the DS1 data format, only frequency synchronization is necessary because phase information is contained in the data stream itself. In the DS0 data format, both phase and frequency synchronization is required.

Therefore it is an object of the present invention to provide circuitry allowing DS0 format data transfers of maximum length and provide phase adjustment over greater length data transfers.

It is yet another object of the present invention to provide circuitry for correcting phase shift problems over extended length transmission lines.

SUMMARY OF THE PRESENT INVENTION

The circuitry of the present invention taps a DS0 data stream and outputs a timing signal to drive terminal multiplexers. A composite clock locked in frequency to an external reference (bit and byte clock) is provided by the present invention with the bit clock at 64 KHz and the byte clock at 8 KHz in the preferred embodiment. To avoid the problem of phase shift over long distances (limiting cable length) the present invention phase adjusts the digital bit stream clocking signal with a 360 degree delay, giving the appearance having zero phase delay. By providing a negative phase delay the ability to transmit over cable lengths equivalent to cable runs from 0-1500 feet in 500 foot increments is also achieved.

In the preferred embodiment of the present invention, a timing output circuit is phase locked to a reference clock signal. This phase locked signal is coupled to a voltage controlled oscillator (VCO). The VCO creates a phase referenced signal. Where the external clock provides frequency only, the phase reference signal represents the phase of the system phase reference. If the clock signal contains phase and frequency information, the phase reference signal recovers the phase information with partial delay less than 360°. Each tap of a shift register is weighted so as to provide progressive phase delay to the clock signal. By selecting certain of the taps, an output clock signal suitable for different transmission lengths is provided. For example, in the preferred embodiment of the present invention, the last tap is such that a full 360 degree delay is introduced to the clock signal. As a result, the clock signal appears to be in phase with the input signal. This output is suitable for timing requirements for transmission lengths up to the line limit. The previous taps in the shift register advance the phase one reconstructed clock at 1:024 MHz, progressively advancing a transmission length windows. For example, by delaying the clock signal one clock time in the preferred embodiment, an output signal suitable for timing length windows between 500 feet and 2000 feet is provided. Other delays increment this window in 500 foot jumps. Of course, the transmission length depends on, among other things, the data rate.

The present invention provides a synchronized distribution timing signal at DS0 or DS1 data rates to digital network devices, including channel banks, switches, etc. Intrasite synchronization is distributed by a composite clock signal providing both phase (byte) and frequency (bit) synchronizing. Intersite synchronization is distributed with frequency synchronizing only. A unique phase advance circuit substantially eliminates timing signal delay through the system with a larger transmission window being the result.

One advantage of the present invention is that it "reclocks" the input timing signal, rather than simply amplifying and repeating it. Thus, there is virtually zero phase delay between the input and output clock signals.

DETAILED DESCRIPTION OF THE PRESENT INVENTION

A timing circuit for increasing the transmission length of DS0 type format data transmission is described. In the following description, numerous specific details such as frequency, tap number, length increments, etc., are described in order to provide a more thorough description of the present invention. It will be obvious, however, to one skilled in the art, that the present invention may be practiced without these specific details. In other instances, well known features have not been described in detail in order not to unnecessarily obscure the present invention.

The present invention is utilized when an external frequency reference is used to establish the frequency content of a signal and phase information is added to the signal by the circuitry of the present invention. The present invention is also applicable when the external timing signal includes both phase and frequency information and that signal is regenerated with control in the output phase.

In telecommunication applications and in particular digital voice and data transmissions, information is digitized and bundled into 8 bit bytes. These bytes are serialized into a time sequential scheme such as a TDM scheme. Typically, the bytes are put together by multiplexer. In one embodiment, each multiplexer has 24 inputs. Each input undergoes an A/D (analog to digital) conversion and is outputted on a serial data bus. The multiplexer can also be used for demultiplexing as well, that is receiving a serial data stream, performing a D/A conversion and outputting 24 analog outputs.

If the transmitting multiplexer is coupled directly to a receiving multiplexer, the transmit and receive operations are independent and no synchronization is necessary. However, in many communication systems, a digital switch is used as an interconnect device. Typically, the digital switch decomposes the serial data strings into individual 8 bit bytes, stores them in memory, re-maps them to other serial data strings, retrieves them from memory and outputs the bytes in the new data strings. The presence of this memory and switching device between multiplexers requires that all devices be operating on the same phase and frequency so that the memory can be accessed.

In telecommunications applications, the digital switch is provided with a clock such as a stratum 3 hierarchy clock. In the preferred embodiment of the present invention, this clock input signal is a nominal 4 KHz. However, the present invention has equal application to any clock input frequency.

Both the transmitting multiplexer and receiving multiplexer derive their clocks from the digital switch clock input. Thus, all the multiplexing points coupled to the digital switch are part of a loop timing situation. In a system solely utilizing the digital clock of the digital switch, there exists a disadvantage of limited transmission length (approximately 1500 feet) in the system. In order to provide extended transmission lengths, a timing generator circuit of the present invention is required.

Figure 1:
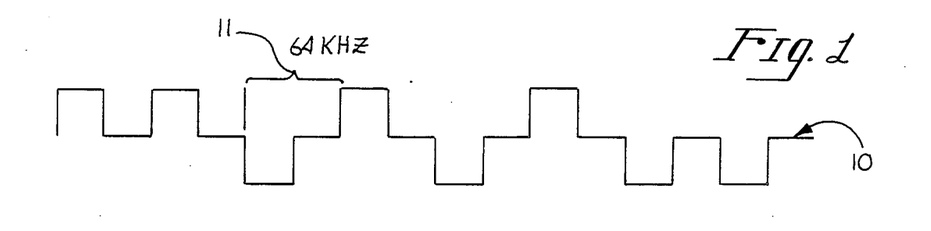
FIG. 1 is a timing diagram illustrating a composite clock signal of the present invention.

In a DS0 data transmission format, the 8 bit data bundles are transmitted at an 8 KHz rate. However, the DS0 data format does not include a framing bit defining the first bit in a frame (phase information). An external clock signal containing both bit clock (frequency) and byte clock (phase) information is required. Such a composite clock signal is illustrated in FIG. 1. In the preferred embodiment, the format of the transmission scheme of the present invention is bi-polar or alternate mark inversion. Each individual pulse 11 of the clock signal 10 occurs at a 64 KHz bit rate. The alternate mark inversion occurs at an 8 KHz rate, defining the byte clock. If the distance between two timed devices is greater than the transmission limit, a phase shift is introduced into the clock signal, limiting the ability to define bit and byte synchronization.

In the present invention, the timing generator circuit intercepts the composite clock signal and adjusts the phase from input to output such that there is a 360 degree delay. By implementing a 360 degree delay, the clock signal appears to be exactly synchronized between the output and the input. The phase shift is implemented with a shift register. By selecting prior taps of the shift register, it appears that the output of the clock signal is advanced in phase. The result is an appearance of the output signal concurrent with to the input signal.

In the preferred embodiment of the present invention, a full cycle, 125 micro second delay is implemented so that the output initially appears simultaneously with the input. The final stage of the output is a shift register, and by taking the output from earlier taps on the shift register, the output appears to be advancing in phase so that the net result is a phase delay through the system of something less than 360 degrees. This allows for compensation for cable lengths of varying distances and provides the ability to cross connect in the DS0 data format. The present invention provides a 1500 foot window in increments of 500 feet. For example, in one implementation, the present invention provides timing signals from 0-1500 feet. In another implementation, timing signals accurate between 500 and 2000 feet are provided, similarly for 1000-2500 and 1500-3000 foot windows.

Figure 4:
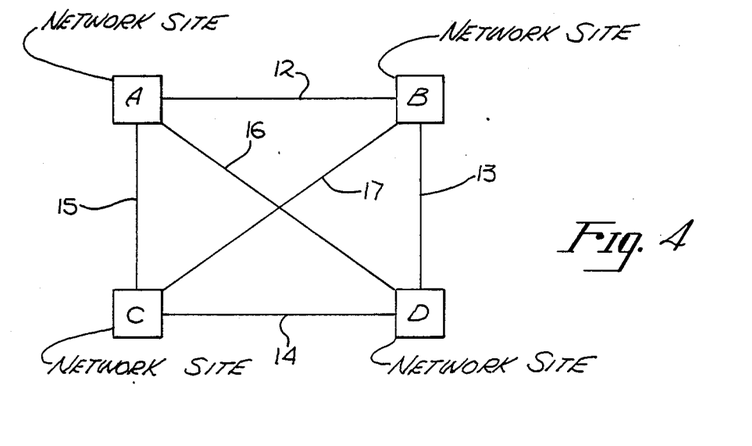
FIG. 4 is a block diagram illustrating a multisite network.

Referring to FIG. 4, a block diagram of an inter-connected network is illustrated. A plurality of individual sites A-D are connected by connection paths 12-17. Typically, each site A-D will have its own timing signal generator driven by a single reference clock signal. For communications between sites, only frequency synchronization is required. For communication between devices within a site, both phase and frequency synchronization are required.

Figure 2:
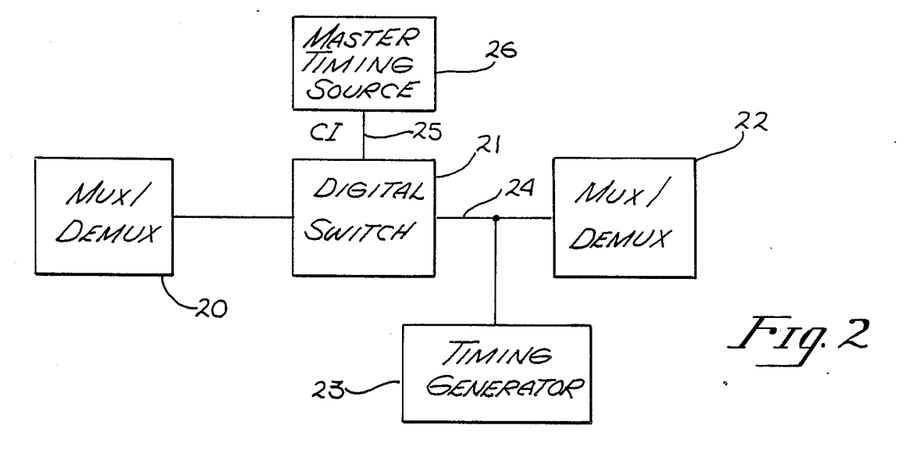
FIG. 2 is a block diagram illustrating an application of the timing circuit of the present invention.

The present invention is illustrated in block diagram in FIG. 2. A multiplexer/demultiplexer 20 is coupled through a digital switching device 21 to a second multiplexer/demultiplexer 22. In actuality, the plurality of multiplexers may be joined as part of a network and connected through one or more digital switches. Clock input 25 is a reference clock signal from master timing source 26 and is provided to digital switch 21. This clock input signal 25 is tapped by a timing generator circuit 23 so that a proper clocking signal may be provided to multiplexer 22.

The clock input signal 25 has a phase and frequency component. The frequency component is required for intersite communication. That is, frequency synchronization is necessary for communication between the various sites of the network.

The phase component of the clock input signal 25 is required for intrasite communication, that is, communication between various phase dependent devices within each site. The timing generator circuit 23 may receive phase and frequency information and output phase and frequency information. In a second application, the timing generator circuit 23 receives only frequency information and generates phase information for each site.

Figure 3:
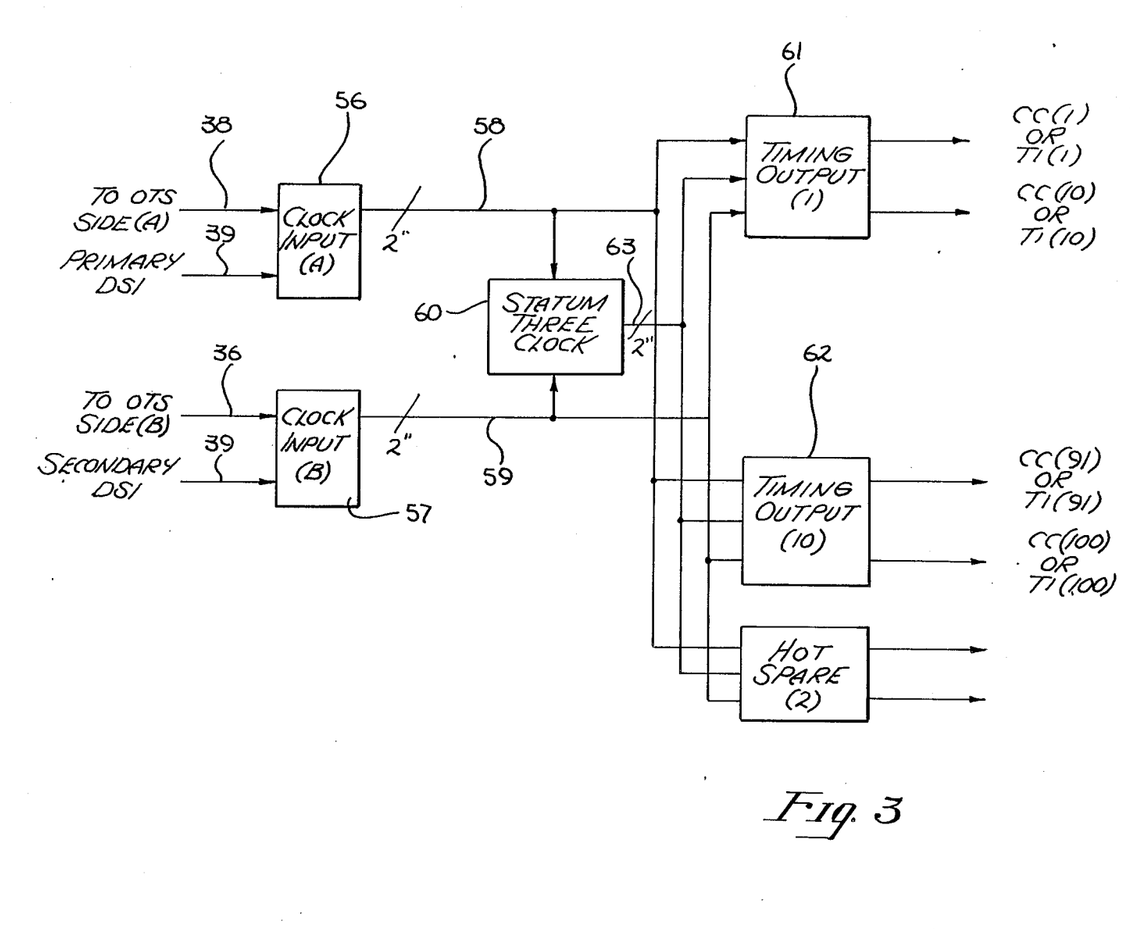
FIG. 3 is a block diagram illustrating the preferred embodiment of the present invention.

The preferred embodiment of the present invention is illustrated in FIG. 3. A pair of clock input cards 56 and 57 each receive a composite clock signal 38 and a DS1 input signal 39. The outputs 58 and 59 of the input cards 56 and 57 respectively are coupled to a stratum three clock card 60 and to a plurality of timing output cards.

The present invention operates from either the composite clock input 38 or the DS1 input 39. Certain of the timing output cards, such as card 61, provide composite clock output and the remainder, such as card 62, provide DS1 output. The stratum three card 60 is phase locked to the input signal selected and provides its own output 63 to the timing output cards. The present invention "reclocks" the input timing signal instead of simply amplifying and repeating it, substantially eliminating phase delay through the circuit. A unique cable compensation circuit provides negative phase delay for extended window cable runs.

Figure 6:
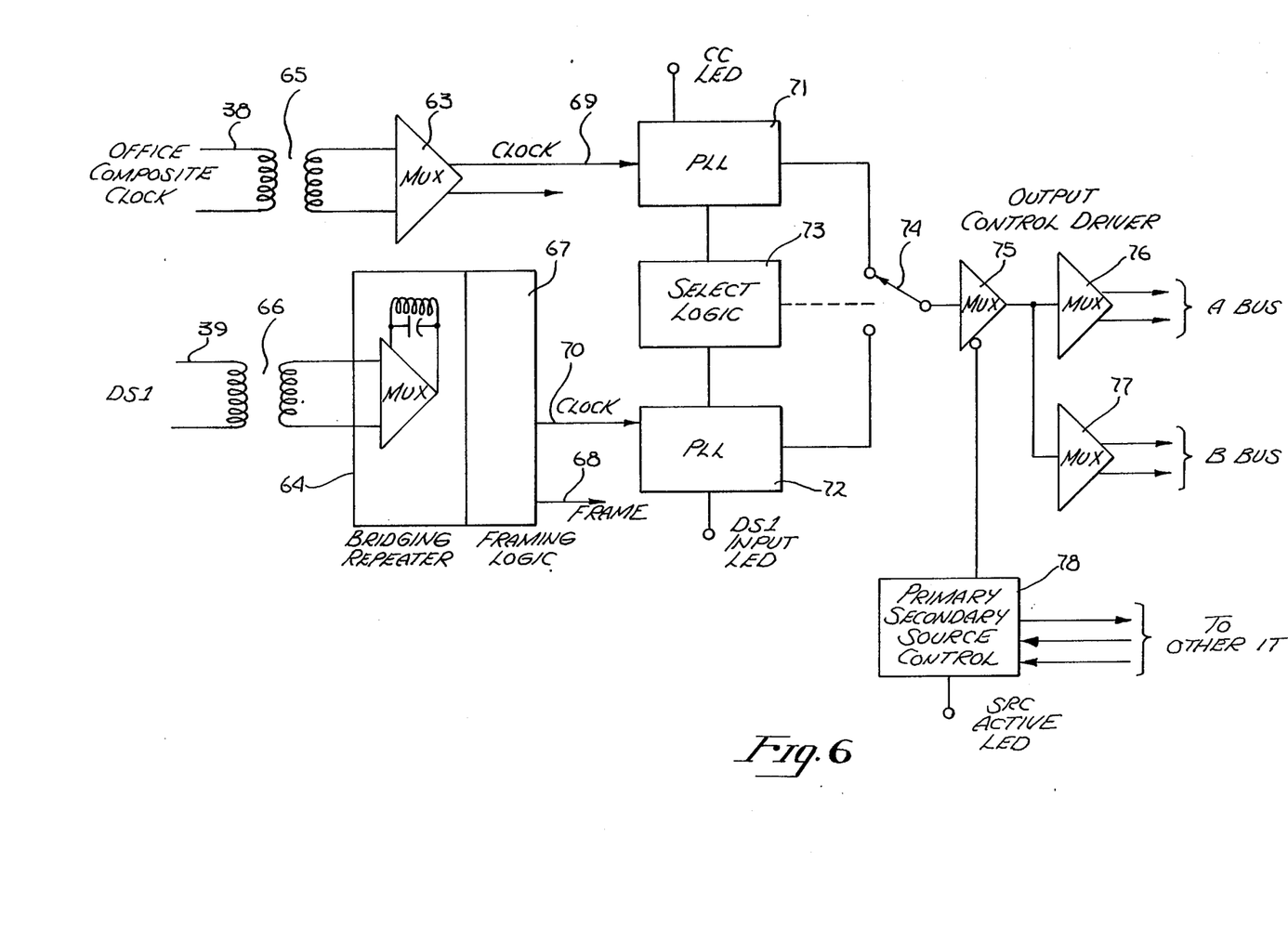
FIG. 6 illustrates the clock input circuit of FIG. 3.

A clock input card is shown in detail in FIG. 6. The composite clock input signal 38 is coupled through transformer 65 to mux 63 and the DS1 input signal 39 is coupled through transformer 66 to mux 64. Mux 64 includes framing logic 67 to capture the frame information 68 from the DS1 input. The outputs 69 and 70 of mux's 63 and 64 are coupled to phase locked loops 71 and 72 respectively. Select logic 73 controls switch 74 to select one of the phase locked loops 71 and 72 to couple to the output control driver.

Switch 74 is coupled to mux 75 whose output is coupled to mux 76 and mux 77. The outputs of mux 76 and mux 77 are coupled to Bus A and Bus B respectively. Bus A and Bus B are coupled to the stratum three card 60 and to the timing output cards of the timing circuit of the present invention. A source control card 78 is coupled to mux 75 and selects the other timing input card if the currently "active" card fails.

The stratum three card 60 provides an alternate set of timing signals on the main bus for the timing output cards. Each timing output card contains signal select logic to select the timing input signal from the internal input of the highest priority. The stratum three card 60 includes a clock holdover circuit such as is described in copending patent application Ser. No. 131,141 filed December 10, 1987, entitled CLOCK HOLDOVER CIRCUIT and assigned to the assignee of the present invention.

Figure 7:
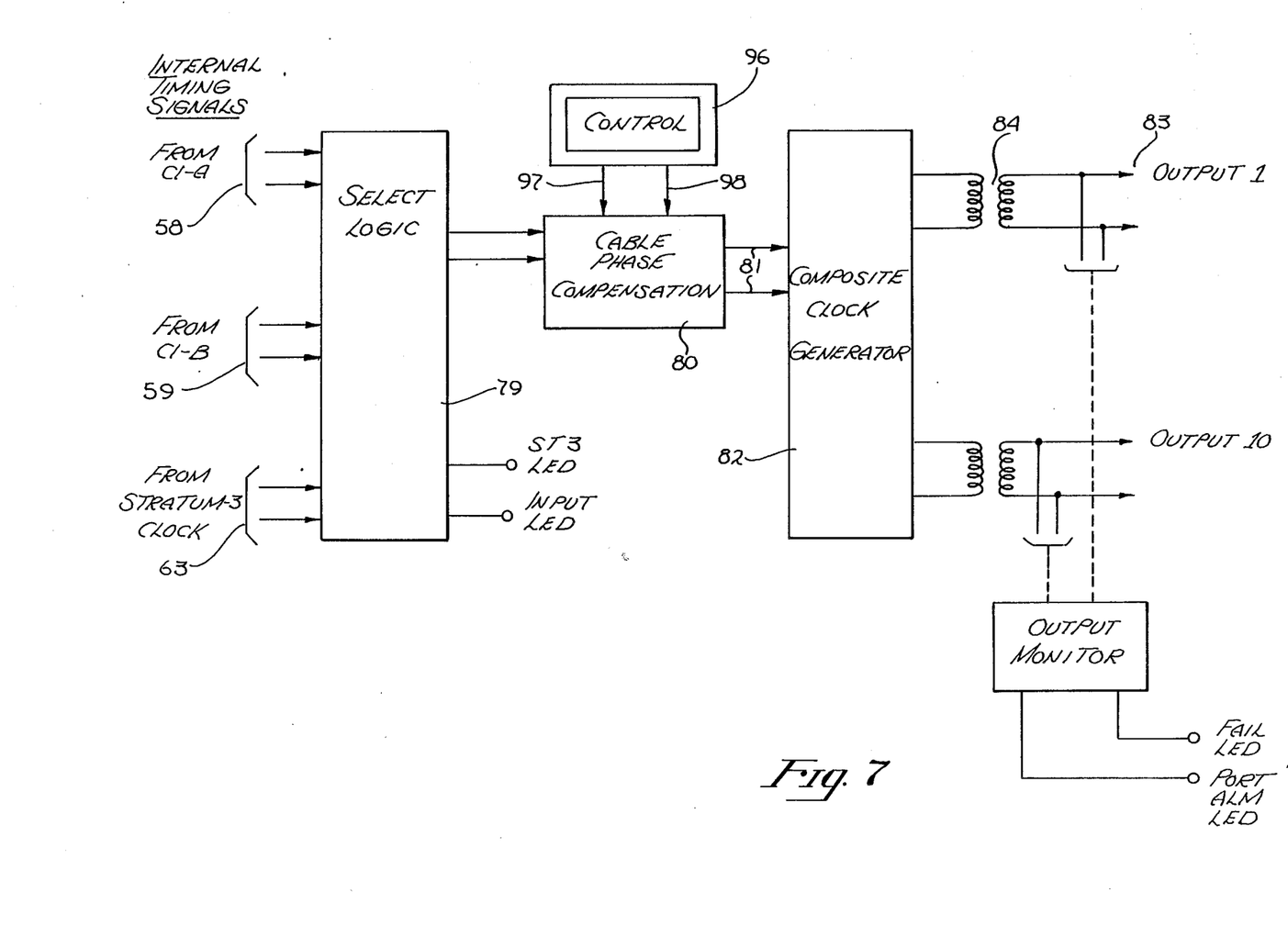
FIG. 7 illustrates a composite clock ouput card of FIG. 3.

The composite clock output card 61 is illustrated in detail in FIG. 7. A select logic block 79 is coupled to the outputs 58 and 59 from the clock input cards 56 and 57 respectively and to the output 63 of the stratum three card 60. The select logic block 79 selects one of the three inputs and provides it as output to the cable phase compensation circuit 80. The cable compensation circuit 80 reconstitutes the internal timing signal with an additional delay applied to its output signal 81. The delay is one frame width plus a negative phase delay equivalent to cable runs of 0–1500 feet in 500 foot increments. Thus, the output timing signal from a composite clock output card can drive external timed devices located up to 3000 feet from the present invention. The window of the cable compensation circuit 80 is controlled by signals 97 and 98 of control block 96. The control block 96 may be a pair of switches used to define four windows of cable transmission length.

The output 81 of the cable compensation circuit 80 is provided to a composite clock generator 82 to generate the output composite clock signal 83. The reconstituted and delayed composite clock timing signal 83 is applied to each port driver through one of the plurality of impedance matching transformers. In the preferred embodiment, a composite clock timing output card port can drive up to six external devices and each output card contains up to ten ports. The composite clock output signal is illustrated in FIG. 1.

Figure 8:
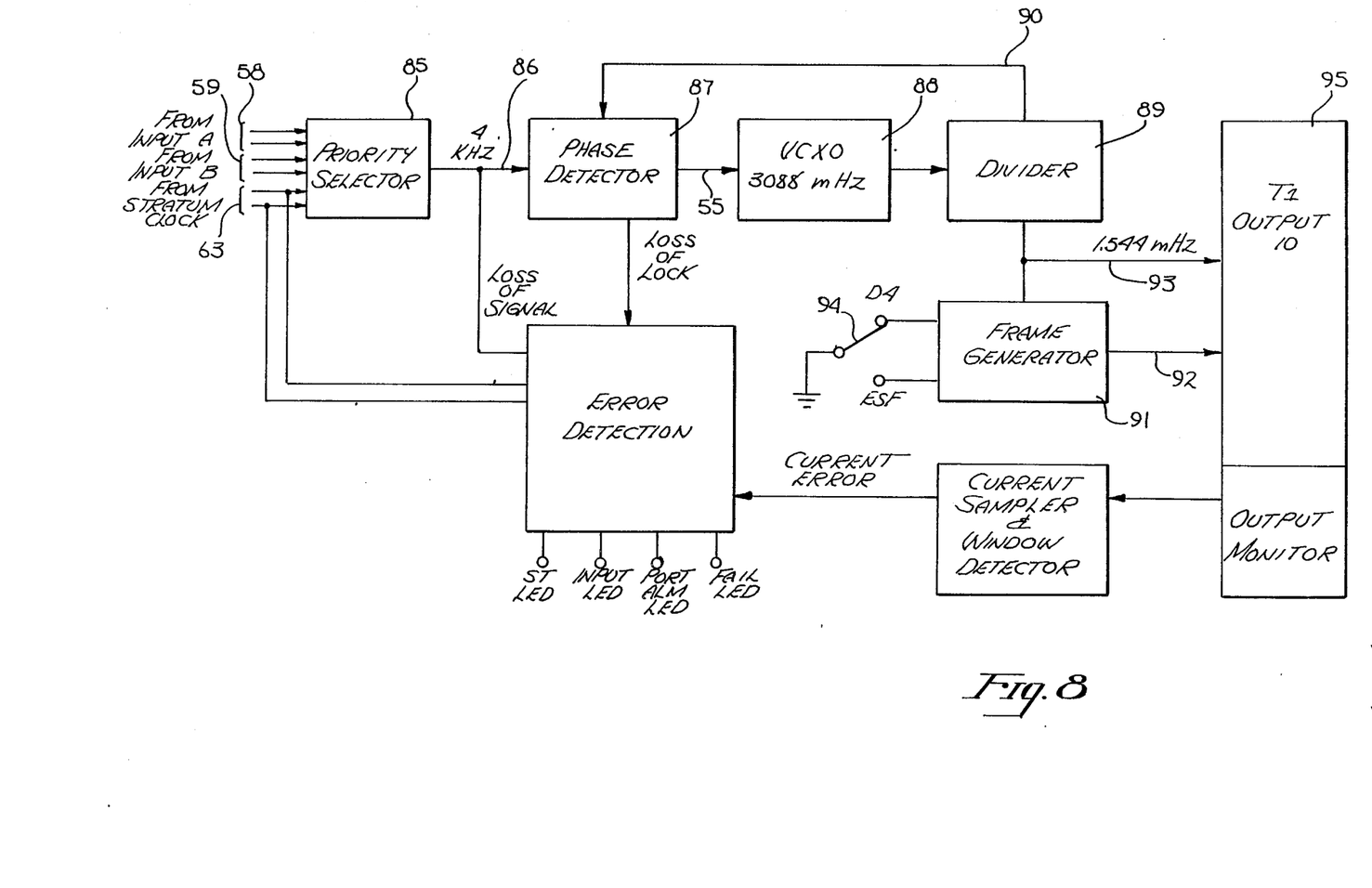
FIG. 8 illustrates a DS1 output card of FIG. 3.

A DS1 timing output card is illustrated in FIG. 8. A priority selector 85 selects one of the three inputs and provides an output 86 to phase detector 87. Phase detector 87 provides an output 55 to a crystal based voltage controlled oscillator (VCO) 88. The output 93 of VCO 88 is coupled to divider 89. The divider 89 is coupled in a feedback loop 90 to phase detector 87. The output of divider 89 is coupled to frame generator 91, which generates a framing signal 92 in either D4 or ESF mode depending on the position of switch 94. The output 93 of divider 89 and frame generator 91 is coupled to the DS1 output card ports 95.

Figure 5:
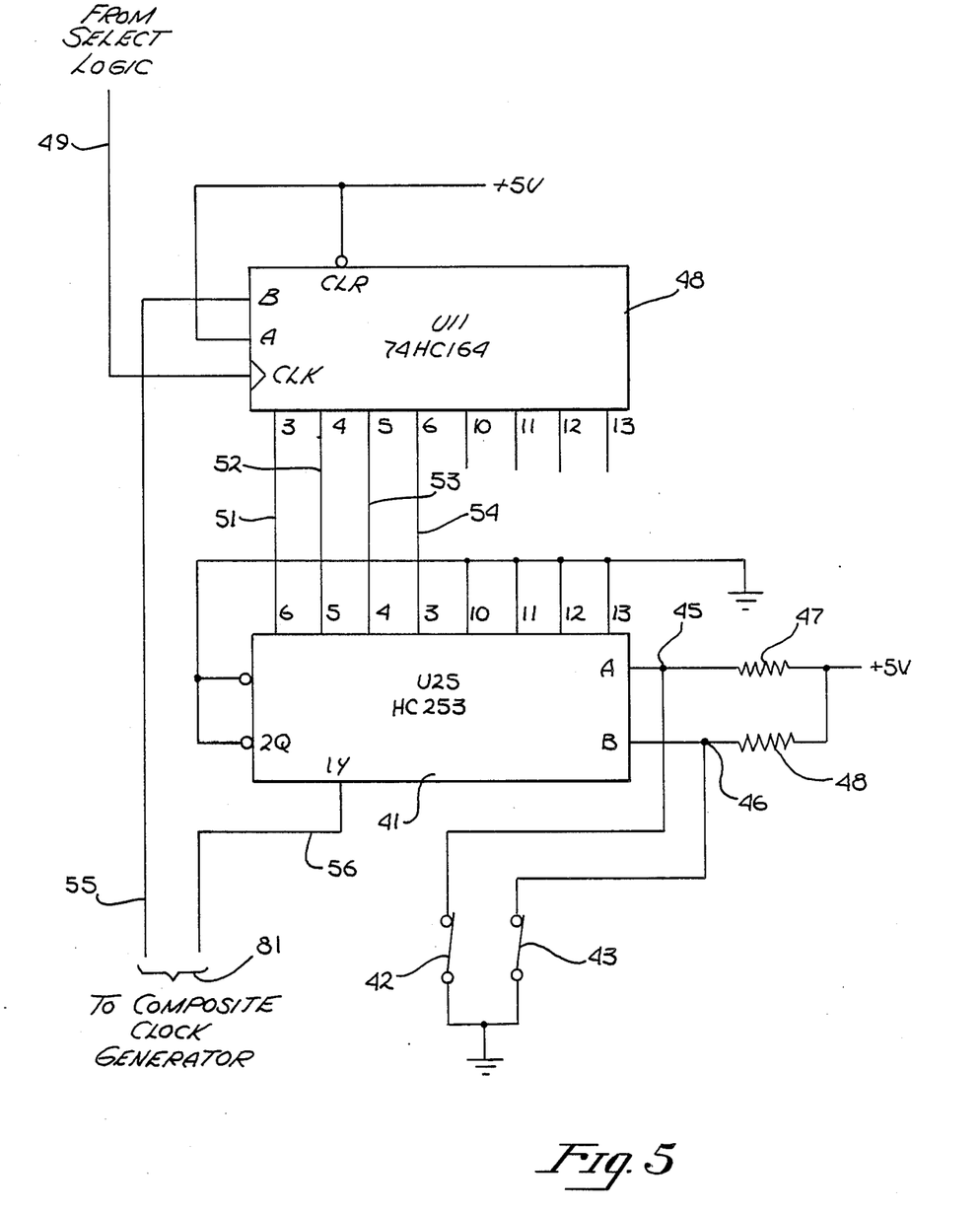
FIG. 5 illustrates the cable compensation circuit of the present invention.

The cable compensation circuit of the present invention is illustrated in FIG. 5. A clock input signal 49 from select logic 79 is provided as clock input to shift register 48. The shift register 48 has a plurality of taps with taps 51–54 coupled to a selector 41. Selector 41 is used to select the amount of phase delay introduced to the timing signal. The amount of phase delay determines the transmission length window of the present invention. In the preferred embodiment of the present invention, tap 54 represents a full 360° phase delay of the input signal. Each prior tap 51–53 represents advances in phase of one clock period each.

Switches 42 and 43 control which of taps 51–54 of shift register 48 is selected. One terminal of switches 42 and 43 is coupled to ground. The remaining tap of switch 42 is coupled, at node 45, to the "A" input of selector 41 and through resistor 47 to a 5 volt supply voltage. The remaining terminal of switch 43 is coupled at node 46 to the "B" input of selector 41 and through resistor 48 to the supply voltage.

In the preferred embodiment of the present invention, tap 54 is selected when both switch 42 and 43 is open. When switch 42 only is closed, tap 53 is selected. When switch 43 only is closed, tap 52 is selected and when both switches are closed, tap 51 is selected. Switches 42 and 43 allow a user of the present invention to select both the amount of phase delay and ultimately, the transmission length window of the input signal.

The output 55 of shift register 48 provides frequency (bit) information to the composite clock generator 82 (see FIG. 7). The output 56 of selector 41 represents phase information of the input signal after having undergone the desired amount of delay.

The zero phase delay of the compensation circuit of the present invention means that the circuit itself disappears for purposes of cable length calculation. By advancing phase, new length windows can be defined. The phase is advanced by selecting different taps on the shift register, where each tap is one clock time (in the preferred embodiment, 1.024 MHz). Each clock time is equal to a 500 foot cable increase. The timing length windows in the preferred embodiment are as follows:

0 ≦ cable length ≦ 1500 feet,
500 ≦ cable length ≦ 2000 feet,
1000 ≦ cable length ≦ 2500 feet,
1500 ≦ cable length ≦ 3000 feet.

The maximum distance between the timing circuit of the present invention and timed devices receiving clocking signals from the present invention is a function of the data rate. In the preferred embodiment, this distance is a nominal 1500 feet. If the data rate is higher, the distance is less. If the data rate is lower, the distance is greater.

Thus, a compensation circuit which allows increased transmission lengths in a DS0 digital data transfer format is described.

We claim:

1. A timing circuit comprising:
   first clock input means for receiving first and second clock input signals, said first clock input signal having frequency information and said second clock input signal having frequency and phase information, said first clock input means selecting one of said first and second clock input signals and providing a first output signal;
   first timing output means coupled to said first output signal, said first timing output means for providing a second output signal having frequency and phase information when said first clock input signal is selected;
   second timing outpout means coupled to said first output signal, said second timing output means for providing a third output signal having frequency information when said second clock input signal is selected;
   said first timing output means having phase delay means for introducing a phase delay into said first output signal.

2. The circuit of claim 1 wherein said first clock input means comprises first and second phase locking means coupled to said first and second clock input signals respectively.

3. The circuit of claim 1 wherein said first clock input signal comprises a composite clock signal.

4. The circuit of claim 3 wherein said composite clock signal comprises an alternate mark inversion format clock signal.

5. The circuit of claim 1 wherein said second clock input signal comprises a DS1 format clock signal.

6. The circuit of claim 1 wherein said phase delay means comprises a shift register having a plurality of selectable taps, each of said taps providing a predetermined phase delay to said first output signal and further including swtiching means coupled to said shift register for selecting one of said taps.

7. The circuit of claim 1 further including second clock input means for receiving said first and second clock signals, said second clock input means selecting one of said first and second clock input signals and providing a fourth output signal to said first and second timing output means.

8. A timing circuit comprising:
   first and second clock input means for receiving first and second clock input signals, said first and second clock input means for selecting one of said first and second clock input signals and providing first and second output signals respectively;
   first timing output means coupled to said first and second output signals for selecting one of said first and second output signal and providing a third output signal having frequency and phase information when said first clock input signal is selected;
   second timing output means coupled to said first and second output signals for selecting one of said first and second output signals and providing a fourth output signal having frequency information when said second clock input signal is selected;
   said first clock input signal comprising a composite clock signal having frequency information;
   said second clock input signal comprising a DS1 clock signal having phase and frequency information;
   said first timing output means having phase delay means for introducing a phase delay to said first and second output signals.

9. The circuit of claim 8 wherein said composite clock signal comprises an alternate mark inversion format clock signal.

10. The circuit of claim 8 wherein said phase delay means comprises a shift register coupled to a selected one of said first and second output signals and having a plurality of taps, each of said taps providing a predetermined phase delay to said selected signal, said phase delay means further including switching means coupled to said shift register for selecting one of said plurality of taps.

11. The circuit of claim 10 wherein said plurality of taps comprises first second third and fourth taps, said fourth tap introducing a phase delay of 360° and each preceding tap introducing a delay of one clock period of said first and second clock input signals.

12. The circuit of claim 8 wherein said first and second timing output means include switching means for selecting one of said first and second output signals.

13. The circuit of claim 8 wherein said second clock input means includes decoding means for decoding phase information contained in said second clock input signal.

* * * * *